United States Patent [19]

Carlson et al.

[11] Patent Number: 4,664,511
[45] Date of Patent: May 12, 1987

[54] VACUUM FRAME REGISTRATION BOARD WITH STATIC SINK

[75] Inventors: Chesley F. Carlson, Minneapolis; Mikel J. Bixby, Brooklyn Center, both of Minn.

[73] Assignee: Chesley F. Carlson Co., Minneapolis, Minn.

[21] Appl. No.: 850,215

[22] Filed: Apr. 10, 1986

[51] Int. Cl.$^4$ .............................................. G03B 27/20
[52] U.S. Cl. ....................................... 355/91; 355/75; 355/128
[58] Field of Search .................. 354/348, 292; 355/75, 355/32, 35, 54, 53, 113, 78, 91, 128

[56] References Cited

U.S. PATENT DOCUMENTS

| | | | |
|---|---|---|---|
| 3,400,630 | 9/1968 | Carlson | 355/75 |
| 3,635,558 | 1/1972 | LePeer et al. | 355/75 X |
| 3,695,760 | 10/1972 | Orr | 355/75 X |
| 4,142,794 | 3/1979 | Trump | 355/75 X |
| 4,158,847 | 6/1979 | Heinzl et al. | 346/140 R |
| 4,161,365 | 7/1979 | Anderson et al. | 355/75 |
| 4,284,349 | 8/1981 | Beasley et al. | 355/75 X |
| 4,382,676 | 5/1983 | Ohta et al. | 355/75 |
| 4,450,536 | 5/1984 | Schroeder | 355/75 |
| 4,504,845 | 3/1985 | Kattner et al. | 346/140 R |

FOREIGN PATENT DOCUMENTS

| | | |
|---|---|---|
| 55-101466 | 8/1980 | Japan . |
| 55-117666 | 9/1980 | Japan . |
| 55-130783 | 10/1980 | Japan . |

*Primary Examiner*—Richard A. Wintercorn
*Attorney, Agent, or Firm*—Dorsey & Whitney

[57] ABSTRACT

A registration board capable of dissipating static electricity through a conductive sink for use in a vacuum frame exposure system. The board comprises a bottom layer with channels and slots for registration pin flex plates, a middle layer for spacing and with guide holes for the registration pins, and a top layer of a conductive and resiliently compressible material. The static electricity that builds up from movement of materials in a vacuum frame printing process is bled off the conductive top layer through a conductive element placed between the top and middle layer and extending to the underside of the bottom layer which can either merge the static electricity with the greater field of the blanket or be selectively attached to an external ground connector.

21 Claims, 4 Drawing Figures

Fig. 3　　Fig. 4

VACUUM FRAME REGISTRATION BOARD WITH STATIC SINK

BACKGROUND OF THE INVENTION

1. Field of the Invention

The present invention relates to a registration board capable of dissipating static electricity through a conductive sink. The registration board is used in a vacuum frame exposure printing system that exposes a plate or film through the image of the desired copy material that has been placed inside the frame.

2. Background Art

When creating successive images of desired copy material (hereinafter "Copy"), each image in exact register with the registration system, multiple images are created by sequentially exposing light sensitive material through negatives or positives on top of the blanket in a conventional vacuum frame exposure system. It is necessary that the Copy maintain exact alignment through the multiple exposures. In so doing, it is possible to achieve dot-for-dot registration and a perfect reproduction of every line and dot over the entire image.

The prior art recognizes the use of a copy board and registration pins to maintain registration of Copy during an exposure process. For example, the patent to Carlson, U.S. Pat. No. 3,400,630, issued Sept. 10, 1968, shows alignment pins positioned on a copyboard insert set up to create an image on a frame of film. The positioning of material to be photographed is achieved by placing holes in the material over the alignment pins to establish a defined relationship with prepunched film positioned over fixed pins in the back of the camera. Continuity of register control is realized by projecting the image from the prepunched film to prepunched photographic plates where both the film and plates are pinned.

A vacuum frame exposure system has, however, two special problems that are not dealt with by the prior art.

First, because of the uneven movement of the blanket as a vacuum is created in the frame, there is the potential for movement of the plate or film being exposed in relationship to the vehicle holding the Copy resulting in what is commonly known as "tail-whip". As the glass cover of the vacuum frame is closed, the registration pins must descend vertically so that they are flush with the surface of the Copy. Even a small lateral movement of the pins as they descend will disrupt the register and the further the Copy is from the holes and pins, the greater the loss of register. Second, static electricity is generated before the glass cover is closed as the materials are moved in contact with each other. Because of the inability of the vehicle with the Copy and the Copy to move freely due to static electricity, the buildup of static electricity also results in a loss of register.

Loss of register in the vacuum frame is a consistent and costly problem. Loss of register in the vacuum frame is the single greatest source of loss of register in the graphic arts industry. Thus, a device which will increase the control of register and lessen the detrimental effects of static electricity would be greatly welcomed.

SUMMARY OF THE INVENTION

The present invention contemplates a registration board for holding Copy (the sensitized emulsion as well as the negative or positive image above it) in a vacuum frame printing system. The registration board is capable of dissipating static electricity through a conductive sink. The registration board consists of a generally rigid bottom layer, a middle layer, and a conductive and resiliently compressible top layer bonded together with flexible adhesive. Disposed in channels in the bottom layer and extending up through guide holes in the middle and upper layers are a plurality of registration pin assemblies. Each registration pin assembly utilizes a bushing guide and consists of a lower plate of spring-like material and a spring like upper plate with a registration pin attached to and centered on the upper surface.

Static electricity is drained from the conductive upper layer by means of a conductive element connected to the upper layer, between the upper layer and middle layer and continuing along the bottom surface of the bottom layer of the board. Thus, static electricity created by movement of the Copy is drained off and merged with the greater field of the blanket. The conductive element may also be grounded by means of an external connection to the vacuum frame or any other earth ground.

The size of the board and the configuration of the registration pin assemblies is arbitrary and may be adapted to the requirements of any punching mechanism and vacuum frame printing system.

DESCRIPTION OF THE DRAWINGS

FIG. 3 is a sectional detail view taken along line 3—3 of FIG. 2;

FIG. 4 is a sectional detail view taken along line 4—4 of FIG. 2;

DESCRIPTION OF THE PREFERRED EMBODIMENT

Figure 1:
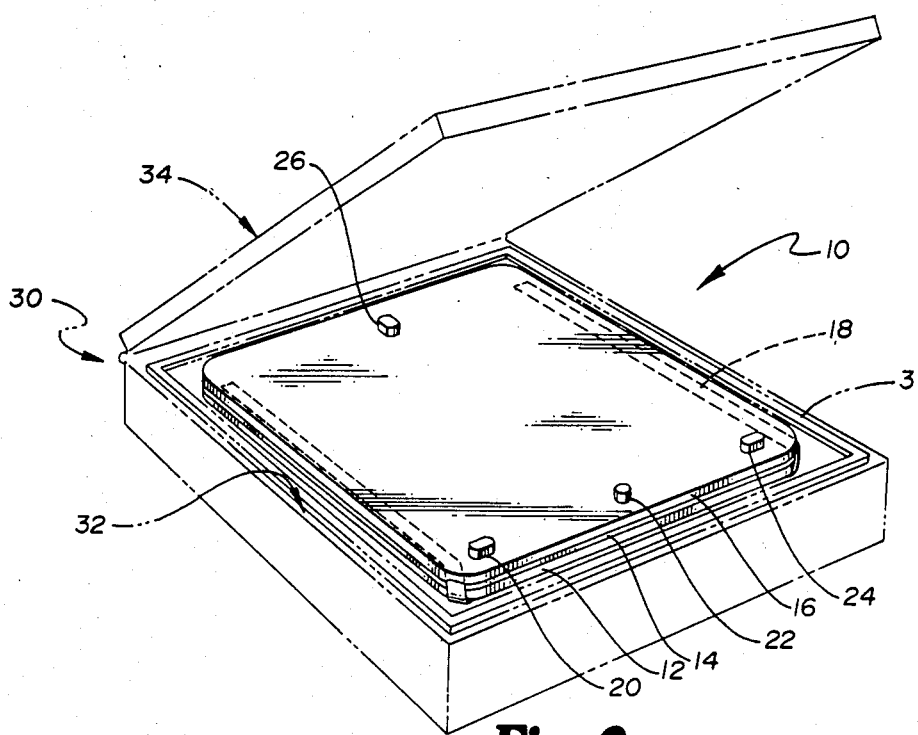
FIG. 1 is a perspective view of a vacuum frame shown in phantom with the invention mounted therein.

Referring to the drawings, a registration board 10 in accordance with the present invention broadly includes a bottom layer 12, a middle layer 14, a conductive upper layer 16, a conductive strip or element 18, and registration pin assemblies 20, 22, 24, and 26. A vacuum frame 30 is also shown, but for reasons of clarity only the blanket 32 and the glass cover 34 are identified.

The bottom layer 12 is generally rectangular in shape and may be made of a single sheet of a relatively stiff but flexible plastic material like polypropylene. The middle layer 14 is a single sheet of similar dimensions to that of bottom layer 12, and may be made of a material like acrylic PVC. The top layer 16 is also a single sheet of similar dimensions to bottom layer 12, and is preferably made of a compressible material such as crosslink polyethylene. Top layer 16 is also preferably embedded with carbon particles to provide a uniform conductive surface.

A plurality of arbitrarily located registration pin assemblies 20, 22, 24, and 26, are disposed in the three aforesaid layers 12, 14, and 16. The exact shape, number and orientation of registration pin assemblies 12, 14 and 16 conforms to the specification of the particular punching mechanism (not shown) used to punch materials (Copy) to be used on the board 10. As shown in the drawing the proof board 10 is configured to receive Copy punched on a three hole punch for the leading edge of the Copy and also punched with a single trailing edge punch. As shown, two generally transversely oblong pins 60 and a cylindrical pin 60 are used, in pin assemblies 20, 24 and 22 respectively, for the leading edge. An oblong pin 60 oriented in the direction of travel of the plate when used on a press, is used in pin assembly 26. It will be understood by those skilled in the art that a trailing edge punch is often not used and a greater or lesser number or differently shaped or located holes and pins 60 can be used.

To assure correlation with the punching mechanism and near perfect registration it is preferred that a user or purchaser of the board punch an aluminium strip in the field with the punch that will be used with the board 10 prior to assembly of the board 10. This strip is used as a fixturing-device to locate apertures in the layers 12, 14, 16 and to assemble the board 10, particularly the bushings 50, to be discussed below.

Since the function and description of the registration pin assemblies 20, 22, 24, and 26 is substantially similar, it is described only once with respect to the perspective views shown in FIGS. 3 and 4 of registration pin assembly 22.

Registration pin assembly 22 consists of registration pin 60, upper plate 62, and lower plate 64. The combination of these elements performs the vertical movement required of registration pin 60 when it comes into contact with glass cover 34. The mounting system for securing registration pin assembly 22 is comprised of slot 40, channel 42, guide holes 44 and 46 and a bushing 50 with guide hole 52.

Slot 40 which pentrates the bottom layer 12, and channel 42 are machined into bottom layer 12 to hold the two flex plates that are involved in the registration pin assembly, upper plate 62 and lower plate 64. Channel 42 is generally rectangular in shape, with dimensions sufficient to accommodate lower plate 64, approximately 2 inches in length and ½ inch in width. Channel 42 is recessed to a depth of roughly half the width of bottom layer 12. Slot 40 is cut entirely through bottom layer 12 in the location of channel 42 so that it extends from side to side and of channel 42 and proportionally extends from end to end. Bushing 50, a thin rectangular stainless steel plate precisely punched to just accommodate the pin 60 overlaps the flex plates 62 and 64 and is preferably glued to the bottom layer using the aluminum fixturing assembly created by the punch in the field. Guide hole 44 is cut or punched in middle layer 14 so that it accommodates the horizontal cross section of registration pin 60 and guide hole 46 is cut or punched into top layer 16 so that it also accommodates the horizontal cross section of registration pin 60. The location of bushing 50 and guide holes 44 and 46 is such that, when all three layers are in identical planar orientation to each other and registration pin assembly 22 is placed in channel 42, registration pin 60 extends vertically upward, without tilt, through guide holes 44, 46 and 52 and protrudes above the top surface of top layer 16.

The registration pins 60 are normally generally cylindrical or oblong columns with an overall height not substantially greater than the combined thickness of the three layers 12, 14, and 16. Bushing 50 is preferably a thin stainless steel plate with a tolerance of 0.00025 between the pin 60 and aperture 52 in the bushing 50. Upper plate 62 is made of stainless steel or similar material, bowed toward the upper layer 16, with registration pin 60 welded or staked to the center of this plate and fixtured during assembly to eliminate tilt. Lower plate 64 is preferably cut from blued tempered spring steel or similar material.

Both plates 62 and 64 are generally rectangular in shape and of sufficient length to extend beyond the opening 40 in bottom layer 12. There is a nominal tolerance of .005 in width between the flex plates 62, 64 and the channel and slot 42, 40. Bottom plate 64 extends substantially from end to end of channel 42 in bottom layer 12, and substantially from side to side, approximately 2 inches long by ½ inch wide. The length of bottom plate 64 and channel 42 is sufficient to form a concave surface capable of receiving the portion of register pin 60 which when depressed extends to the bottom of the board 10. Upper plate 62 may be of a length shorter than lower plate 64, but must be sufficiently long to cover slot 40.

Ground element 18 is a conductive strip, usually copper, that is placed between upper layer 16 and middle layer 14. The conductive strip 18 preferably extends to the underside of bottom layer 12 so as to form a connection with the electronic field of the blanket 32, or, in an alternative embodiment shown in FIG. 2, may be grounded by means of a female connector 38, which would then provide a connection to ground 36 or to a relatively larger metal surface such as to the vacuum frame.

In assembly, the registration pin assemblies 20, 22, 24 and 26 are inserted into the corresponding slot 40 and channel 42 in bottom layer 12. The bushings 50 are inserted over the pins 60 and overlay the flex plates 62, 64 in pin assemblies 20, 22, 24 and 26 and each is fixtured with the aluminum plate punched in the field to locate and precisely position the bushings and pin assemblies while the bushings 50 are being adhered to the bottom layer 12. Middle layer 14 is positioned with guide holes 44 over each corresponding registration pin 60. Conductive element 18 is placed on top of middle layer 14 and wrapped to the underside of bottom layer 12. Top layer 16 is positioned with guide holes 46 over each corresponding registration pin 60. The unique three ply construction is bonded with a flexible adhesive and trimmed to the desired dimensions.

Referring particularly to FIG. 1, the registration board 10 is shown resting on vacuum frame 30 on blanket 32. The glass cover 34 is shown in the open position, but is hinged to vacuum frame 30 so that it will close on registration board 10. When glass cover 34 is closed, each of the layers of registration board 10 performs a specific function. Bottom layer 12 is made of a material of sufficient rigidity to resist the uneven movement of the blanket 32 while the vacuum is being drawn, yet with a resilience that makes possible a broad adaptation to the planarity required when the creation of a vacuum brings the surface of the Copy on the upper layer 16 into contact with the glass cover 34 so that there is full and uniform contact over the entire surface. Bushings 50, adhered to the bottom layer 12 prevent horizontal movement or any other lateral deviation during the required vertical movement of registration pins 60.

Middle layer 14 is also of sufficient rigidity to accommodate the plurality of guide holes 44 and serves to provide clearance in the board to receive the pins 60 in the pin assemblies 20, 22, 24 and 26 and retain them substantially within the thickness of the board 10. Finally, the material of top layer 16 performs three functions. First, it is a compressible layer with the essential adaptability required to give a virtually perfect planarity with the surface of glass cover 34. Second, it conducts static electricity. This enables it to draw off static electricity through grounding element 18. Last, placement of the board 10 in the vacuum frame displaces a sufficient amount of air to permit rapid evacuation of air during the creation of a vacuum in frame 30. Because top layer 16 is made of a cross-link material, it enhances the rapid evacuation of air.

Figure 2:
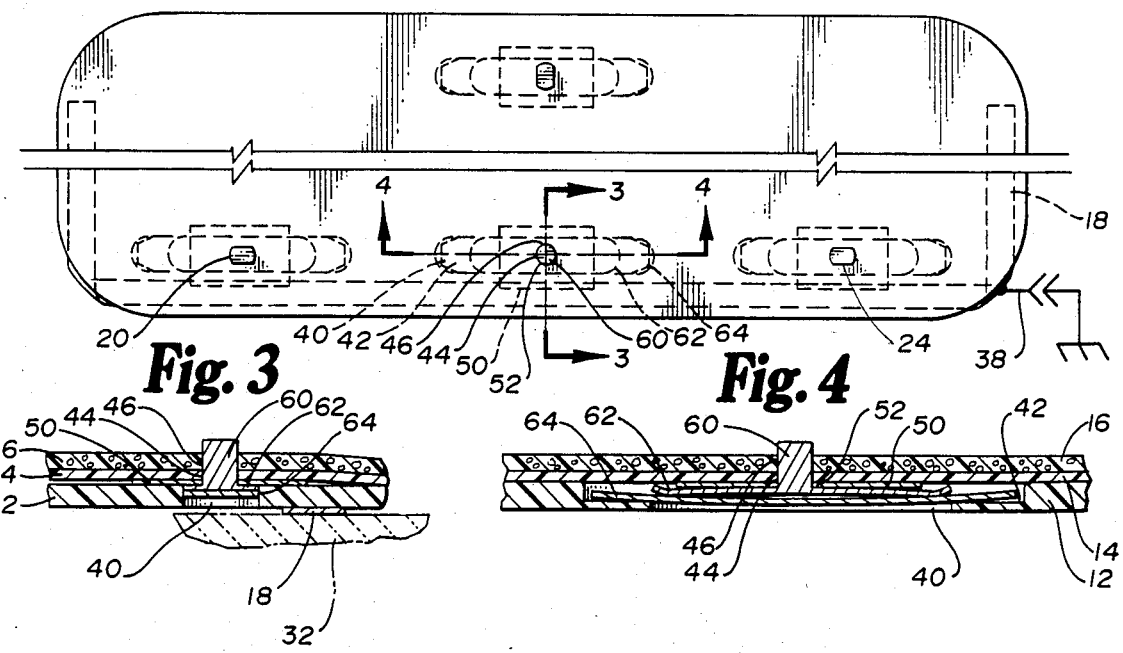
Fig. 2 is a top view of the board foreshortened to save space.

Now looking at FIGS. 2-4, the key to register control in the frame is an absolute control of registration pin travel by means of the resiliently retractable registration pin assemblies 20, 22, 24, and 26. The invention provides for two unique means for such control. First, to stabilize the entry of registration pin 60 into blanket 32, a two-plate concept is involved. First, as downward pressure is exerted by registration pin 60 meeting glass cover 34, the plates 62 and 64 permit the pin to be withdrawn into the board and minimally contact the blanket uniformly and on a broad surface. There is no twisting, lateral displacement or other departure from the vertical of registration pin 60 in any of the pin assemblies 20, 22, 24 and 26. This method of performing the resiliently retractable function required of registration pin 60 is also desirable because the penetration of blanket 32 is minimized due to the depth of the channel 42 and slot 40 dimensions and since it occurs on a broad surface. Second, the registration pin 60 is projected upward through the guide hole 52 in bushing 50. There is minimal tolerance in the guide hole 52 of bushing 50 to give solid direction vertically to pin travel.

Referring to FIG. 2, the static electricity built up by movement of materials on the board is bled off from the conductive top layer 16 through ground element 18. This is accomplished either by contact between ground strip 18 on the underside of bottom layer 12 and the larger field in blanket 32, or by connecting grounding element 18 to female connector 38 attached to earth ground 36, as shown in FIG. 2, or to a larger metal surface such as by connecting it directly to the metal support of the vacuum frame 30.

In general, while the description entails the specific embodiments of the invention, it is to be understood that this is for purposes of illustration only. It will be obvious from a review of the Description of the Preferred Embodiment set forth above and the accompanying drawings that there are various alternative embodiments and expedients which can be employed and still gain the advantages of the invention. For example, while the copper grounding strip 18 is the preferred embodiment of the invention, those skilled in the art will recognize that the registration assemblies 20, 22, 24, 26, themselves, form a conductive path to the blanket when they are depressed and the lower flex plate comes into contact with the blanket 32. It will also be obvious that the two flex plates 62, 64 can be replaced by a single flex plate to maintain the pin in an upward position while registering Copy and to receive the pin 60 into the dimension of the board 10 when the glass cover 34 is closed on the board 10. Certain objectives and advantages of the invention may also be achieved without utilization of the middle layer 14. The dimension of either the bottom layer 12 or the top layer 16 may be increased to provide the clearance provided by the middle layer 14 and advantages of the invention may still be achieved. It is also obvious that the registration board may be of other than rectangular shape, the registration pin spacing may be adjusted, and the number of registration pins may be selected according to the size of the subject matter. It is evident that various modifications can be made within the scope of the invention as set forth by the following claims.

We claim as our invention:

1. A photographic copy board for holding an image and a light sensitive emulsion in registration comprising in combination:
   a generally rigid planer bottom layer having a plurality of apertures therein;
   a resiliently compressible top layer;
   a plurality of retractable pin assemblies extending from the bottom layer through the top layer, each of said pin assemblies comprising:
   a registration pin;
   at least one flex plate to which the registration pin is secured which normally positions the registration pin above the surface of the top layer but which is retractable into one of the apertures in the bottom layer when pressure is applied to the top of the registration pin;
   each of said pin assemblies having a height which is slightly greater than the distance between the top of the top layer and the bottom of the bottom layer; and
   means for dissipating static electricity generated by the placement and movement of the image and light sensitive emulsion on the copy board.

2. The copy board of claim 1 wherein said means for dissipating static electricity comprises carbon particles embedded in the resiliently compressible top layer.

3. The copy board of claim 2 wherein the means for dissipating static electricity comprises a copper strip in contact with the top layer and extending to the bottom of the bottom layer.

4. The copy board of claim 2 wherein the means for dissipating static electricity comprises at least one conductive registration pin in contact with the carbon impregnated top layer, said conductive registration pin being connected to a conductive flex plate which extends slightly beyond the bottom of the bottom layer when the registration pin is depressed.

5. The copy board of claim 1 wherein the copy board further comprises a third layer interposed between the top layer and the bottom layer, the third layer being of a sufficient thickness so that the overall thickness of the multilayer copy board is sufficient to receive substantially all of the height of each of the registration pin assemblies when the pin assemblies are retracted into the copy board.

6. The copy board of claim 5 wherein the means for dissipating static electricity comprises carbon particles embedded in the top layer and a conductive strip having two end portions and a middle portion positioned so that the end portions are sandwiched between the top layer and the middle layer and the middle portion is extended around the middle layer and bottom layer to be located on the bottom surface of the bottom layer.

7. The copy board of claim 1 wherein at least one of the apertures in the bottom layer comprises a channel formed in the top of the bottom layer and having a depth of approximately half of the thickness of the bottom layer and a slot penetrating through the bottom layer the slot having a lateral dimension approximately equal to the lateral dimension of the channel.

8. The copy board of claim 7 wherein the copy board comprises at least two flex plates, the first flex plate being generally flat and constructed of spring steel and having a width of approximately equal to the channel and slot and a length approximately equal the length of the channel and the second flex plate being positioned in the channel above the first flex plate and having a width approximately equal to the width of the channel slot and being bowed toward the top layer and wherein the registration pin is vertically affixed to the center of the second flex plate.

9. The copy board of claim 1 further comprising: a bushing having an aperture therein to receive the registration pin which is securely fixed to the bottom layer to ensure vertical travel of the registration pin when it is retracted.

10. The copy board of claim 1 wherein the top layer comprises a plurality of apertures each aperture being of a size to accommodate each of the plurality of registration pins.

11. The copy board of claim 5 wherein each of the top layer and middle layer further comprise a plurality of apertures each aperture being aligned with and of a size to accommodate one of the plurality of registration pins.

12. The copy board of claim 1 wherein the copy board is to be used in a vacuum frame having a blanket and a glass cover in which a vacuum is to be drawn and wherein the dimensions of the copy board substantially fills the vacuum frame and the thickness of the copy board extends substantially from the blanket to the cover whereby insertion of the copy board in the vacuum frame substantially displaces the air in the frame enhancing the creation of the vacuum in the vacuum frame.

13. The copy board of claim 1 wherein the bottom layer is constructed from a relatively stiff flexible plastic material.

14. The copy board of claim 13 wherein the bottom layer is constructed from polypropelene.

15. The copy board of claim 1 wherein the top layer is constructed of cross-linked polyethylene with carbon particles embedded therein.

16. The copy board of claim 5 wherein the middle layer is constructed of acrylic PVC.

17. In a vacuum frame printing process, said vacuum frame including structure defining a glass cover and a blanket, a registration board capable of dissipating static electricity through a conductive sink, comprising:
a generally rigid planar bottom layer;
a conductive and resiliently compressible top layer;
a middle layer interposed therebetween;
a conductive element attached to said top layer capable of being connecting to ground;
a plurality of channels arbitrarily located in the bottom layer, having two ends and two sides;
a plurality of slots located in the bottom layer corresponding to said channels, whereby the openings created in the bottom layer extend from side to side of said channels and substantially from end to end;
a plurality of guide holes located in the middle and top layers and corresponding to the center of said slots in the bottom layer;
a plurality of resiliently retractable registration pin assemblies located in said channels of the bottom layer with registration pins extending upward through said guide holes in the middle and top layer, comprising:
a lower plate of a spring-like material to be inserted into said channel in the bottom layer but not pass completely through said slot in the bottom layer and capable of depressing in a concave manner to just below the bottom surface of the bottom layer to penetrate minimally into the blanket of the vacuum frame;
an upper plate with dimension similar in width and shorter in length to the lower plate resting on the lower plate; and
a registration pin having an upper end and a lower end and a height not substantially greater than the total thickness of the bottom, middle, and top layers combined and attached at the lower end to the center of the upper plate;
whereby when the upper end of the registration pin comes into contact with the glass cover of the vacuum frame, the registration pin is driven vertically downward and descends to a height flush with the top surface of the top layer and the upper and lower plates depress below the bottom layer to accommodate the height of the pin and upon release of the glass cover the registration pin is returned to its original position protruding above the top surface of said top layer by the spring force of the upper and lower plates.

18. The invention as recited in claim 17 further comprising a plurality of thin planar metal guide hole plates of dimensions greater than the width of said channels with one guide hole located in each plate having an opening just large enough to accommodate the horizontal cross section of the corresponding registration pin and located between said bottom layer and said middle layer so that the corresponding registration pin passes through the guide hole, whereby the guide hole plate provides support and stability for the upper end of said registration pin.

19. The invention as recited in claim 17 further comprising a conductive strip having two end portions and a middle portion and located with the end portions sandwiched between said upper layer and the middle layer and the middle portion located on the bottom surface of the bottom layer whereby when the registration board is placed on the blanket in the vacuum frame, static electricity created by placement and movement of material on the copy board is dissipated from the top layer through the conductive strip to merge with the electric field of the blanket in the vacuum frame.

20. The invention, as recited in claim 17 further comprising a conductive element in contact with said top layer and a connector capable of attaching to an external ground sink connector.

21. A means for assembling a copy board to be used with image carrying film and a light sensitized emulsion, the copy board having a bottom layer and a top layer with a plurality of registration pins extending from the bottom layer through the top layer and bushings supporting each of the registration pins, comprising:
punching on the punch that is going to be used with the image carrying film and the vehicle for the light sensitized emulsion a rigid strip of material;
locating the apertures in the bottom layer and the top layer using the prepunched strip of material;
inserting the registration pins in the bottom layer;
positioning the bushings over the registration pins with an adhesive applied thereon so that the bushings will adhere to the bottom layer; and
using the prepunched rigid strip of material to position the registration pins and the bushings prior to adhering the bushings to the bottom layer so that the completed copy board will be in exact register with the punch that will punch the materials that will be used on the copy board.

* * * * *